(12) United States Patent
Godoy et al.

(10) Patent No.: US 6,737,862 B1
(45) Date of Patent: May 18, 2004

(54) MAGNETOSENSITIVE LATCH ENGAGEMENT DETECTOR FOR A MECHANICAL FASTENING SYSTEM

(75) Inventors: Arquimedes Godoy, Chihuahua (MX); Daniel A. Martinez, El Paso, TX (US); Daniel J. Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/437,755

(22) Filed: May 14, 2003

(51) Int. Cl.⁷ .................................................. G01B 7/14
(52) U.S. Cl. ........................... 324/207.21; 324/207.26; 701/45
(58) Field of Search ........................ 324/207.21, 207.26, 324/207.11, 207.13; 73/826, 865.9; 701/45

(56) References Cited

U.S. PATENT DOCUMENTS

| | | | |
|---|---|---|---|
| 3,671,893 A | 6/1972 | Edgar et al. | 335/179 |
| 4,094,046 A | 6/1978 | Takada | 24/230 AK |
| 4,196,500 A | 4/1980 | Happel et al. | 24/230 AL |
| 4,575,908 A * | 3/1986 | Gloomis et al. | 24/650 |
| 4,899,424 A | 2/1990 | Barnes et al. | 24/641 |
| 5,404,102 A | 4/1995 | Gokhale et al. | 324/252 |
| 6,081,759 A * | 6/2000 | Husby et al. | 701/45 |

* cited by examiner

*Primary Examiner*—N. Le
*Assistant Examiner*—Subhash Zaveri
(74) *Attorney, Agent, or Firm*—Jimmy L. Funke

(57) ABSTRACT

A contactless latch engagement detector for a mechanical fastening system operating on the principle of magnetosensitivity. A magnetosensitive switch composed of a magnetosensitive device and at least one biasing magnet adjacent the magnetosensitive device are located in a buckle. Within or external to the buckle is an electronic circuit for driving the magnetosensitive device, and a flux bar composed of a ferromagnetic material having a high magnetic permeability is associated with a movable component of the system. In operation, the electronic circuit drives the magnetosensitive device, wherein its output is responsive to position of the flux bar relative to the magnetosensitive device. The flux bar moves responsive to position of a tongue within the buckle, whereby the fastened state of the mechanical (ie., seat belt) fastening system is detected when a predetermined output occurs.

6 Claims, 2 Drawing Sheets

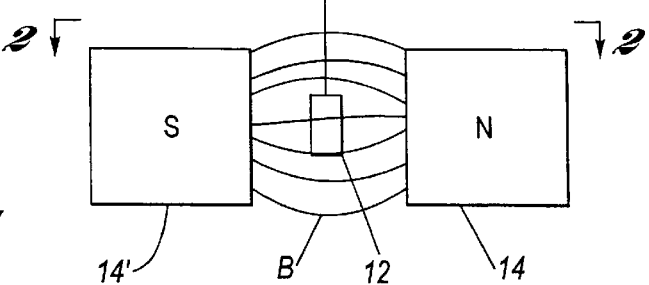
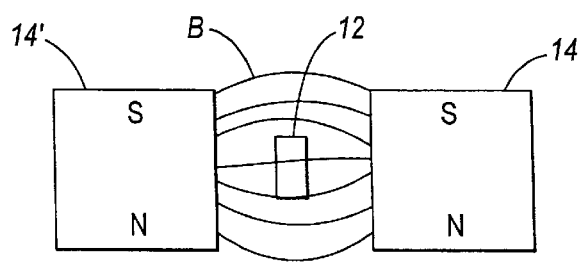
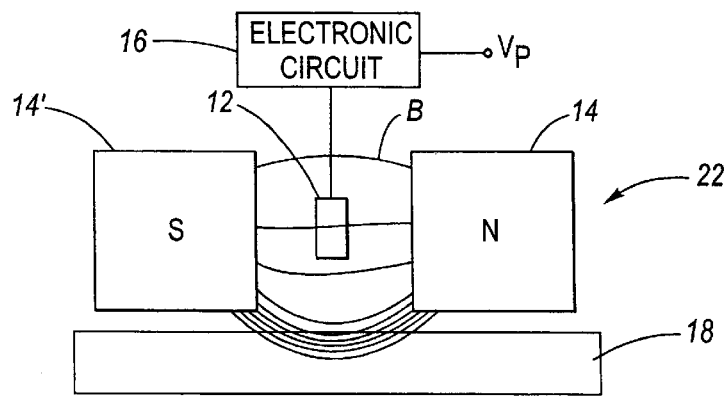
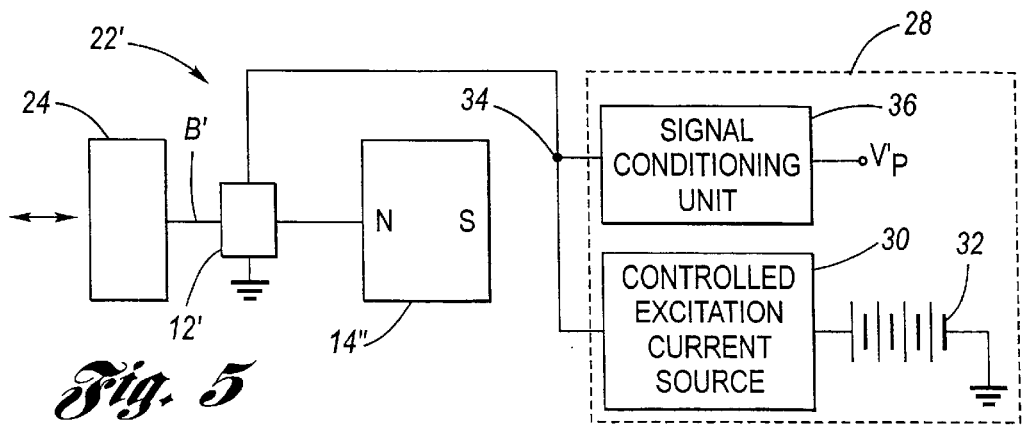

MAGNETOSENSITIVE LATCH ENGAGEMENT DETECTOR FOR A MECHANICAL FASTENING SYSTEM

TECHNICAL FIELD

The present invention relates to mechanical fastening systems, and more particularly to automotive seat belts. Yet more particularly, the present invention relates to a detector of a fastened state of a seat belt fastening system.

BACKGROUND OF THE INVENTION

Automotive seat belts generally include first and second seat belt components which are selectively fastened together by a fastening system in order to retain a passenger seated in the event of an untoward incident involving the motor vehicle. Typically, a seat belt has the following attributes. A first seat belt component includes a first section of seat belt and a shoulder harness belt which are, respectively, connected at one end to immovable anchorages and at the other end to a tongue. The tongue is composed of a strong, rigid metallic material, and has a latch aperture formed therein. A second seat belt component includes a second section of belt which is connected at one end to an immovable anchorage and at the other to a buckle. The buckle has located therewithin a spring loaded latch and externally a manual release for the latch. In operation, the tongue is placed into the buckle until seated, whereat the latch has entered into the latch aperture so as to firmly and positively locate the tongue irremovably with respect to the buckle, unless manually released via the release. The buckle and the tongue collectively form a seat belt fastening system which is critical to operation of the seat belt.

Examples of seat belt fastening systems include U.S. Pat. Nos. 4,094,046; 4,575,908; and 4,899,424.

A concern is whether or not a seat belt has been properly fastened at the fastening system. That is, whether or not the tongue is properly seated in the buckle such that the latch of the buckle is positively located in the latch aperture of the tongue, wherein the latch engagement prevents the tongue from backing out of the buckle unless intentionally released by the seated occupant of the vehicle. U.S. Pat. No. 4,196,500 describes a seat belt buckle having a leaf switch which is biased normally open, but is bent against the biasing by the forward end of the tongue, such that contact is made when the tongue has been seated sufficiently far into the buckle that the latch must be located in the latch aperture.

Latch engagement detection may, for example, take the form of an appropriate circuit causing a warning light and/or sound to inform the seated occupant of the vehicle that the seat belt is not properly fastened. Mechanical switches, in general, are susceptible to wear in terms of the moving component and in terms of the electrical contacts. Therefore, what is needed in the seat belt art is a latch engagement detector which is contactless.

SUMMARY OF THE INVENTION

The present invention is a contactless latch engagement detector for a seat belt operating on the principle of magnetosensitivity.

It is known that magnetosensitive devices, such as Hall effect devices and magnetoresistors have an electrical response related to proximity and direction of a magnetic field, respectively. For example, magnetosensitive devices, such as magnetoresistors (MRs) and Hall effect devices have been used as non-contacting position and angle sensors with respect to a rotating toothed wheel, as for example exemplified by U.S. Pat. No. 5,404,102. In such applications, the magnetoresistor (MR) is biased with a magnetic field and electrically excited, typically, with a constant current source or a constant voltage source. A magnetic (i.e., ferromagnetic) object moving relative, and in close proximity, to the MR, such as a toothed wheel, produces a varying magnetic flux density through the MR, which, in turn, varies the resistance of the MR. The MR will have a higher magnetic flux density passing through it, and, consequently, a higher resistance when a tooth of the moving target wheel is adjacent to the MR than when a slot of the moving target wheel is adjacent to the MR.

The magnetosensitive latch engagement detector according to the present invention includes, within the seat belt buckle, a magnetosensitive switch composed of a magnetosensitive device and at least one biasing magnet adjacent the magnetosensitive device. In addition, the latch engagement detector also includes, within or external to the buckle, an electronic circuit for driving the magnetosensitive device, and a flux bar composed of a ferromagnetic material having a high magnetic permeability which is associated with a movable component of the seat belt.

In operation, the electronic circuit drives the magnetosensitive device, wherein a first level of output is registered from the magnetosensitive device responsive to an absence thereat of the flux bar. The flux bar is associated with a moving component of the seat belt, as for example being in the form of the buckle latch or the tongue. When the tongue is seated fully into the buckle, the flux bar will have moved into close proximity to the magnetosensitive device, thereby causing the magnetic field of the biasing magnet(s) to be reduced at the magnetosensitive device. Since the signal output of the magnetosensitive device is responsive to the magnetic flux passing therethrough, the electronic circuit registers a second output signal from the magnetosensitive device indicative that the tongue is properly seated in the buckle and that the latch must be properly engaged.

Accordingly, it is an object of the present invention to provide contactless latch detection for the tongue and buckle which is indicative of whether the fastening system of the seat belt is fastened.

This and additional objects, features and advantages of the present invention will become clearer from the following specification of a preferred embodiment.

BRIEF DESCRIPTION OF THE DRAWINGS

FIG. 1 is a schematic side view of a magnetosensitive device located between a pair of biasing magnets.

FIG. 2 is a schematic plan view, seen along line 2—2 of FIG. 1.

FIG. 3 is a schematic side view of a magnetosensitive device switch having a configuration similar to FIG. 1 and additionally including a movable flux bar, shown located adjacent the biasing magnets.

FIG. 5 is a schematic view of a magnetosensitive device switch using a magnetoresistor, a biasing magnet, a movable flux bar and an electronic circuit for driving the magnetoresistor.

DESCRIPTION OF THE PREFERRED EMBODIMENT

Figure 4:
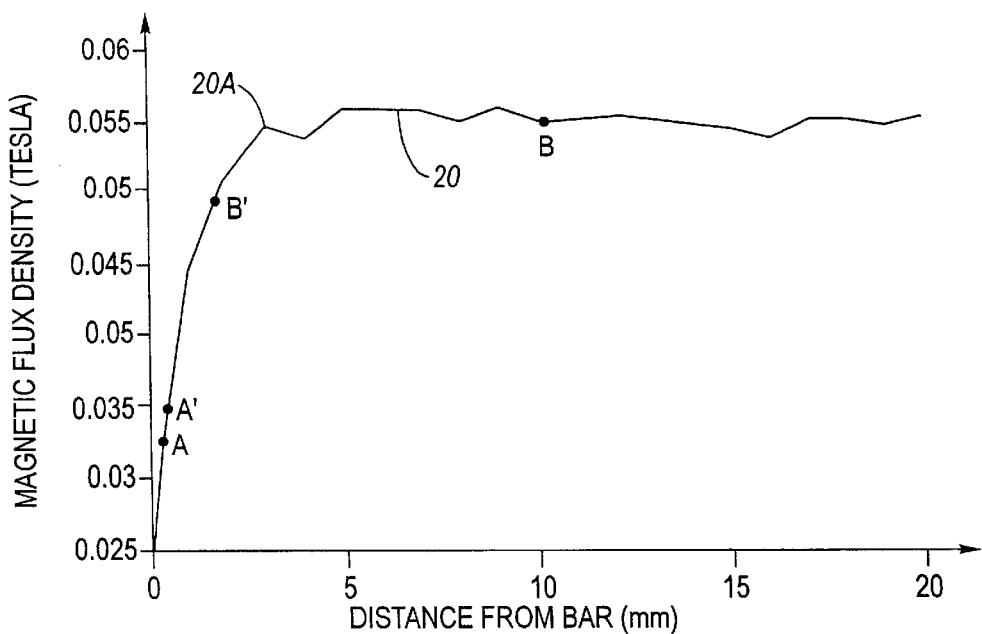
FIG. 4 is a plot of magnetic flux density at the magnetosensitive device versus distance of the flux bar from the biasing magnets for the physical arrangement shown at FIG. 3.

Referring now to the Drawing, FIGS. 1 through 6B depict various aspects of the magnetosensitive latch engagement detector 10 (see FIGS. 6A and 6B) according to the present invention.

FIGS. 1 through 3 depict a principle of operation of the magnetosensitive device latch engagement detector, wherein a magnetosensitive device 12, for example a Hall effect device or a magnetoresistor, is placed into the magnetic field of one of more biasing magnets 14, 14' (two being shown by way of exemplification). A magnetic field B having a first flux density is established at the magnetosensitive device 12, which causes the magnetosensitive device to have a first electrical response registered at $V_P$, via an appropriate electronic circuit 16 for driving the magnetosensitive device 12. As shown at FIG. 3, when a flux bar 18 composed of a highly permeable (ferromagnetic) material is brought into proximity with the biasing magnets 14, 14', then the magnetic field tends to shunt therethrough, causing the magnetic flux density to drop at the magnetosensitive device 12. As a result, the magnetosensitive device has a second electrical response registered at $V_P$.

FIG. 4 depicts a plot 20 of magnetic flux density versus distance of the flux bar 18 with respect to the biasing magnets 14, 14', for the physical arrangement depicted at FIG. 3. It will be seen that the flux density is essentially constant up to a certain distance 20A, then the flux density decreases rapidly for decreasing distances. This result is due to the increasing flux diversion through the flux bar 18 as the flux bar ever more closely approaches the magnets 14, 14'.

FIG. 5 depicts a physical arrangement for implementing a magnetosensitive switch 22 utilizing, by way merely of exemplification, a magnetosensitive device in the form of a magnetoresistor (MR) 12'. In this case, a single biasing permanent magnet 14" provides a biasing magnetic field B'. The MR 12' is preferably fabricated from a material such as indium antimonide, or another suitable semiconductor, as for example, indium arsenide, in a manner well known in the art. The biasing field B' passes through the MR device 12'.

A flux bar 24 is formed of a ferromagnetic material and is movable toward and away from the MR 12' so as to affect the flux density of magnetic field B' seen by the MR. Since the resistance of the MR 12' is a function of the flux density of the magnetic field B', the MR resistance is modulated between first and second values depending upon the maximum in and out movements of the flux bar 24, and is maximum when the flux bar is closely adjacent the MR, and minimum when far away from the MR.

An electronic circuit 28 provides excitation of the MR 12' and provides an output signal $V_P$. A controlled excitation current source 30 delivers a current which flows through the MR 12' to develop a voltage drop across the MR with respect to ground potential. A battery 32 provides electrical energy to power the controlled excitation current source 30. It will be recognized that the voltage appearing at a junction 34 will vary in response to position of the flux bar 24 relative to the MR 12' in accordance with the variation in the resistance of the MR. A signal conditioning circuit 3 6, shown coupled to the junction 34, is preferably provided for processing or conditioning the voltage signal to produce a sensor output voltage $V'_P$.

Figure 6A:
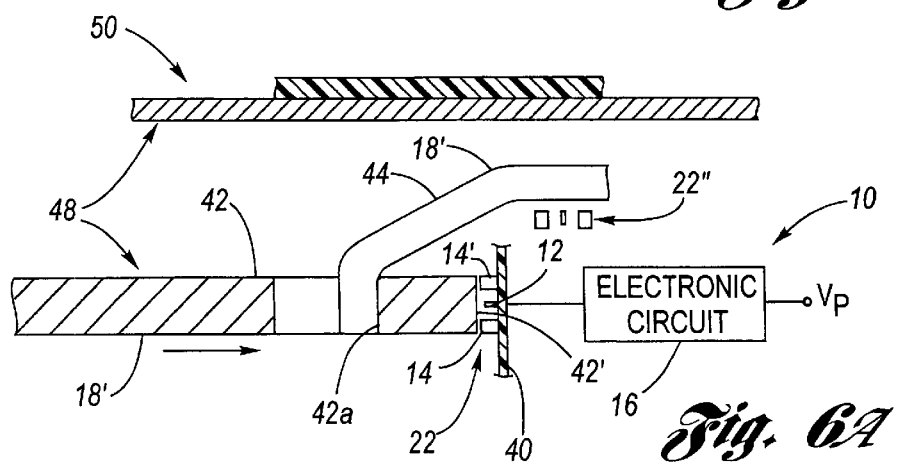
FIGS. 6A and 6B depict first and second states for a magnetosensitive switch interfaced with a seat belt buckle, responsive to whether the tongue is properly seated and latched in the buckle.
Figure 6B:
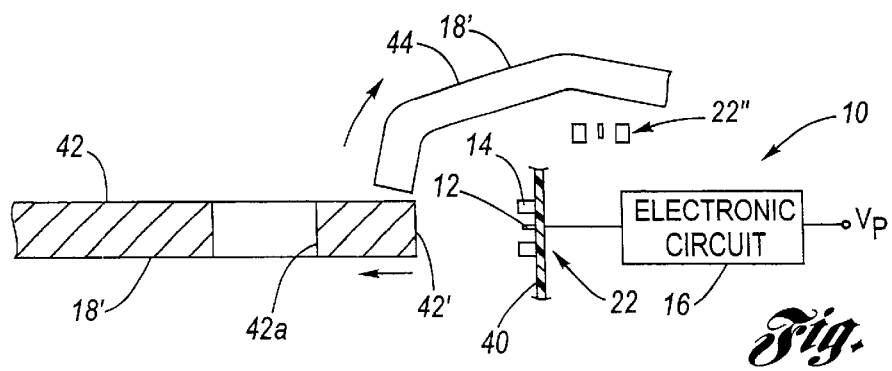

Turning attention now to FIGS. 6A and 6B, an embodiment exemplifying an implementation of the magnetosensitive latch engagement detector 10 will be described with respect to a seat belt fastening system 48. The seat belt fastening system 48 may have any configuration, including a buckle 50 and a tongue 42 latchably engageable with the buckle, configured in any suitable manner, such as discussed hereinabove. The magnetosensitive latch engagement detector 10 utilizes a magnetosensitive switch 22 located in the buckle which provides an output $V_P$ that is responsive to movements of a flux bar.

By way of exemplification, the magnetosensitive swich is depicted as the magnetosensitive switch 22 of FIG. 3, including a pair of biasing magnets 14, 14', a magnetosensitive device 12 (as for example a Hall effect device or a magnetoresistor), and an electronic circuit 16 which is appropriate for driving the magnetosensitive device and for providing an output $V_P$ which is responsive to movement of a flux bar 18' with relation to the magnetosensitive device. The magnetosensitive switch 22 is mounted on a substrate 40 affixed to the buckle 50 thereinside, wherein the substrate may be a circuit board including the electronic circuit. The magnetosensitive switch may take any suitable form, as for example that of FIG. 3 or 5.

By way of further example, the flux bar 18' is any suitable component of the seat belt which moves in relation to the latched/unlatched status of the tongue 42. For example, the flux bar 18' may be the tongue 42, or may be the latch 44 of the buckle 50.

In the case of the tongue 42 serving as the flux bar 18', the end 42' of the tongue, which is composed of a highly permeable (ferromagnetic) material, comes into close proximity with the magnetosensitive switch 22 when the tongue is in the seated position with respect to the buckle whereat the latch 44 must be engaged in the latch aperture 42a of the tongue, as shown at FIG. 6A. At this position of the tongue 42, the magnetosensitive device 12 causes the electronic circuit 16 to output a first signal at $V_P$, as for example related to a flux density A in FIG. 4. At any other position of the tongue, as for example shown at FIG. 6B, the magnetosensitive device 12 causes the electronic circuit 16 to output a second signal at $V_P$, as for example responsive to a flux density B in FIG. 4, wherein the first and second signals are very different from each other, and wherein the first signal denotes the seat belt is fastened and any other signal denotes it is not. An external circuit then provides a driver alert or other function based upon a failure to detect the first signal. For example, if the engine is started, and the external circuit receives a signal from the magnetosensitive latch engagement detector 10 other than the first signal, then a driver alert is activated until the first signal is detected.

In the case of the latch 44 serving as the flux bar 40, a portion of the latch, which is composed of a highly permeable (ferromagnetic) material, comes into close proximity of the magnetosensitive switch 22" which is connected to an electronic circuit 16 (not shown for clarity). When the tongue is in the seated position with respect to the buckle whereat the latch 44 must be engaged in the latch aperture 42a of the tongue, as shown at FIG. 6A. At this position of the latch 44, the magnetosensitive device causes the electronic circuit to output a first signal, as for example related to a flux density A' in FIG. 4. At any other position of the tongue, as for example shown at FIG. 6B, the latch will have moved away from the magnetosensitive device, causing the electronic circuit to output a second signal, as for example responsive to a flux density B' in FIG. 4, wherein the first and second signals are very different from each other, and wherein the first signal denotes the seat belt is fastened and any other signal denotes it is not. An external circuit, as mentioned above, provides a driver alert or other function based upon a failure to detect the first signal.

To those skilled in the art to which this invention appertains, the above described preferred embodiment may be subject to change or modification. For example, while a seat belt fastening system has been particularly elucidated, the principles of the magnetosensitive latch detector according to the present invention apply to any mechanical fastening system. Such change or modification can be carried out without departing from the scope of the invention, which is intended to be limited only by the scope of the appended claims.

What is claimed is:

1. A mechanical fastening system, comprising:
   a tongue;
   a buckle configured to receive therewithin said tongue, said buckle having a selectively releasable latch, wherein said releasable latch selectively retains said tongue irremovably with respect to said buckle when said tongue is seated within said buckle; and
   a magnetoresistive latch engagement detector, comprising:
   a magnetosensitive switch, comprising:
      a magnetosensitive device located within said buckle;
      at least one biasing magnet located adjacent said magnetosensitive device which provides a magnetic field at said magnetosensitive device; and
      an electronic circuit driving said magnetosensitive device and outputting a signal responsive to changes in magnetic flux density of said magnetic field at said magnetosensitive device; and
   a flux bar comprising a component of at least one of said buckle and said tongue, said flux bar being magnetically permeable and movable relative to said magnetosensitive device so as to cause the flux density to vary at said magnetosensitive device responsive to the movement of the flux bar;
   wherein a predetermined signal is provided by said electronic circuit due to movement of said flux bar when said tongue is latchably retained in said buckle, and a signal other than said predetermined signal is provided by said electronic circuit due to movement of said flux bar when said tongue is not latchably retained in said buckle.

2. The mechanical fastening system of claim 1, wherein said flux bar comprises said tongue.

3. The mechanical fastening system of claim 2, wherein said mechanical fastening system is a seat belt fastening system.

4. The seat belt fastening system of claim 1, wherein said flux bar comprises a component within said buckle which is movable with respect to said magnetosensitive device, and movable responsive to position of said tongue within said buckle.

5. The mechanical fastening system of claim 4, wherein said mechanical fastening system is a seat belt fastening system.

6. In a seat belt fastening system comprising a tongue, a buckle configured to receive the tongue therewithin, the buckle having a selectively releasable latch which selectively retains the tongue irremovably with respect to the buckle when the tongue is seated within the buckle, and a magnetically permeable component movable with respect to the buckle responsive to position of the tongue within the buckle, an improvement thereto comprising a magnetoresistive latch engagement detector, comprising:
   a magnetosensitive device located within said buckle;
   at least one biasing magnet located adjacent said magnetosensitive device which provides a magnetic field at said magnetosensitive device; and
   an electronic circuit driving said magnetosensitive device and outputting a signal responsive to changes in magnetic flux density of said magnetic field at said magnetosensitive device;
   wherein the component is movable relative to said magnetosensitive device so as to cause the flux density to vary at said magnetosensitive device responsive to the movement; and
   wherein a predetermined signal is provided by said electronic circuit due to movement of the component when the tongue is latchably retained in the buckle, and a signal other than said predetermined signal is provided by said electronic circuit due to movement of the component when the tongue is not latchably retained in the buckle.

* * * * *